Nov. 12, 1963  J. B. EASTLAND, JR  3,110,165

CABLE SEALING DEVICE

Filed Dec. 10, 1962

INVENTOR.
JOHN B. EASTLAND JR.
BY
ATTORNEY

# United States Patent Office 3,110,165
Patented Nov. 12, 1963

3,110,165
CABLE SEALING DEVICE
John B. Eastland, Jr., 1525 E. Central Ave.,
Fullerton, Calif.
Filed Dec. 10, 1962, Ser. No. 243,513
10 Claims. (Cl. 64—3)

This invention pertains to a device for precluding access to a cable, and in particular to a device for preventing tampering with the speedometer drive cable of a vehicle.

In many instances it is desirable to seal off the drive cable for the speedometer assembly of a vehicle, such as an automobile or a truck, in order to assure the accuracy of the mileage indicator. For example, car and truck leasing concerns normally base a portion of their charge on the distance that the vehicle is driven. Consequently, they must guard against the tampering with the odometer drive to be certain that the customer is paying the proper amount. In the past, it has been proposed to provide some sort of sealing device at either end of the drive cable which must be broken if the cable is to be disconnected to render the odometer inoperative or allow the reading to be changed. However, such devices have not been satisfactory, primarily in view of the difficulty of inspection. The connection to the speedometer assembly beneath the dashboard at one end of the cable, and the opposite connection at the transmission, are quite inaccessible and difficult to view. Hence, as a practical matter the devices of the prior art have not prevented tampering with the odometer drive because the required full inspection of the vehicle almost never is made.

The present invention overcomes such difficulties, however, by providing a device that seals off the cable yet can be inspected in a matter of moments. This is accomplished by means of two flexible tubes fitted over the speedometer drive cable, the tubes having bell ends covering the cable connections both at the transmission and speedometer unit. At the central portion of the cable in the vehicle engine compartment is a threaded sleeve carrying a pair of nuts that bear against the inner ends of the two tubular sections. These nuts are advanced in opposite directions to hold the cable sections firmly in place. A sealing element extends between the two nuts and is arranged so that it will be severed when loosening of the nuts takes place. This sealing element may be located forwardly of the firewall where it is visible instantaneously by the attendant upon raising the hood of the vehicle.

Accordingly, it is an object of this invention to seal off the exterior of a cable.

Another object is to provide a device for preventing tampering with the drive cable of a vehicle speedometer unit.

Another object of this invention is to provide a cable sealing device for vehicles which is readily visible and can be inspected rapidly and without difficulty.

An additional object of this invention is to provide a cable sealing device of low cost yet durable and reliable in construction.

A still further object of this invention is to provide a cable sealing device that can be installed or removed without difficulty.

These and other objects will become more apparent from the following detailed description taken in connection with the accompanying drawing in which.

Figure 1:
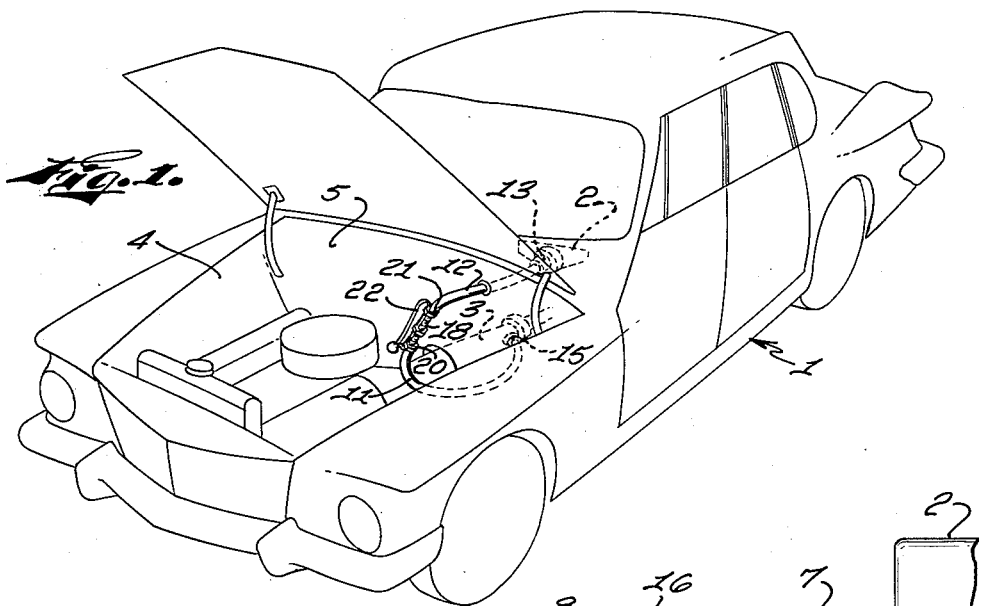
FIGURE 1 is a perspective view of a vehicle that includes the cable sealing device of this invention.

With reference to the drawing, the device of this invention is illustrated in FIGURE 1 as associated with an automobile 1 of conventional design including a speedometer assembly 2 and a transmission 3. In accordance with the usual construction, a power takeoff is provided at the transmission, rotating a cable to drive the speedometer assembly 2. This cable extends from beneath the vehicle to the engine compartment 4 and into the interior of the passenger compartment through an aperture in the firewall 5.

Figure 2:
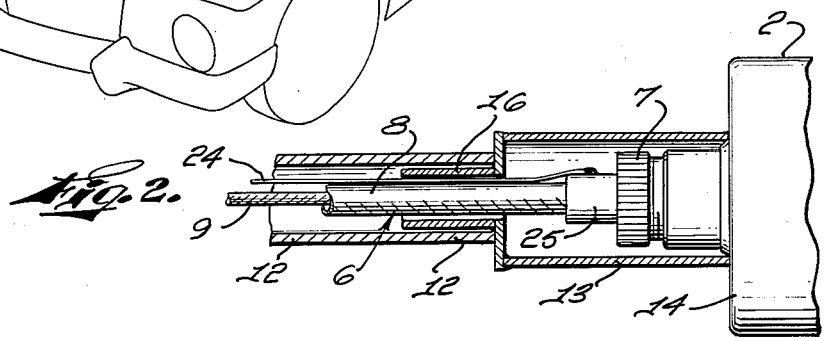
FIGURE 2 is an enlarged longitudinal sectional view of the end portion of the device at the vehicle speedometer assembly.

As seen in FIGURE 2, the upper end of the speedometer cable assembly 6 attaches by knurled nut 7 to the back side of the speedometer assembly 2. The cable assembly 6 includes an outer sleeve 8 within which the flexible wound drive wire 9 may rotate.

At the opposite end of cable assembly 6, a nut 10 secures the outer sleeve 8 to the transmission 3. This enables the cable element 9 to engage the power takeoff of the transmission to in turn drive the speedometer assembly 2.

The device of this invention completely surrounds the cable assembly 6 and extends from the transmission to the speedometer. It includes two flexible outer tubular members 11 and 12 which normally are constructed of wound metal conduit material. Other flexible tubes can be utilized and materials such as plastic also are satisfactory. At the upper end of the tubular element 12 there is an enlarged receptacle end 13 that extends over the nut 7 where the cable assembly is attached to the speedometer unit 2. The distal edge of the element 13 engages the rear wall 14 of the speedometer unit 2.

A generally similar receptacle member 15 is located at the lower end of the other outer tubular member 11. The receptacle 15 fits around the nut 10, and the outer edge of the receptacle 15 engages the face of the transmission housing. These enlarged end elements usually are attached to the tubular members 11 and 12, but may be loose if desired. Also, these end sections preferably include short cylindrical guide portions 16 and 17 which project either into the adjacent flexible tube as shown, or extend over it.

Figure 5:
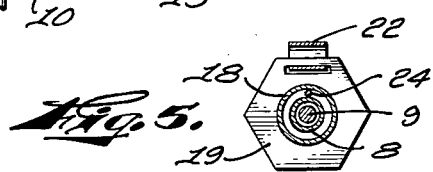
FIGURE 5 is a transverse sectional view taken along line 5—5 of FIGURE 4.

The inner ends of the cables 11 and 12, slidably extend over a rigid tube 18. The latter element, which is continuously threaded on its exterior surface, in turn fits over the outer sleeve portion 8 of the cable assembly 6. At the central portion of the tube 18 is fixed radially projecting member 19 which preferably has a hexagonal configuration as illustrated in FIGURE 5. The member 19 is secured to the tube 18 by suitable means such as welding.

On opposite sides of the fixed member 19 are nuts 20 and 21 which are threadably received on the threaded tube 18. The nut 20 bears against the inner end of the tubular member 11 while the nut 21 similarly engages the tubular section 12. The nuts 20 and 21, as well as the central element 19, are apertured so as to receive a sealing element 22. The seal may simply be a loop of flexible metal fed through the slots in the members 19, 20 and 21 with its ends secured together by a lead seal 23.

Figure 4:
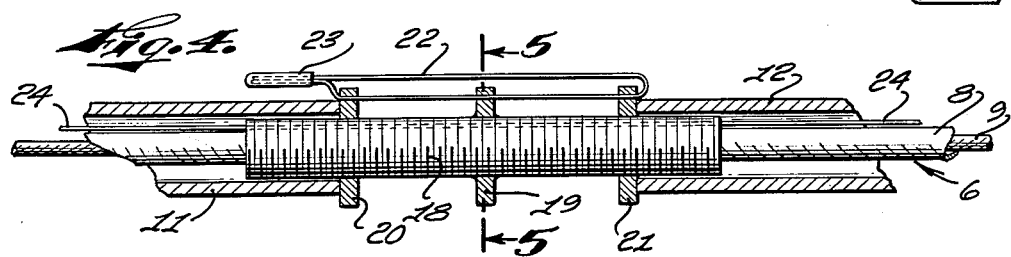
FIGURE 4 is an enlarged longitudinal sectional view of the central locking portion of the device.
Figure 3:
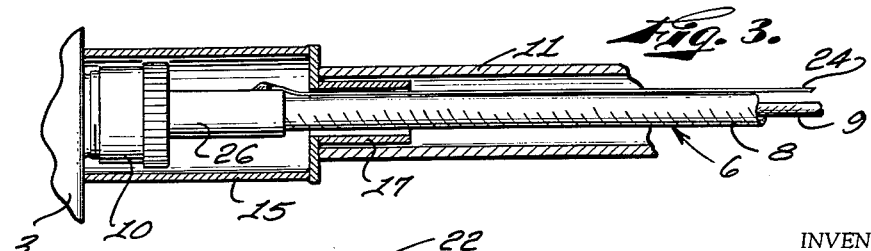
FIGURE 3 is a view similar to FIGURE 2 of the opposite end of the unit.

It is apparent, therefore, that in the position of FIGURE 4 neither nut 20 nor 21 may be rotated relative to the threaded sleeve 18 without severing the sealing strip 22. Hence, the nuts 20 and 21 cannot be removed from their position of engagement with the ends of tubular sections 11 and 12 without breaking the seal. This central portion of the device of the invention preferably is located within the engine compartment 4 where it is readily visible upon lifting the hood of the vehicle 1. In other words, the sections 11 and 12 are made of appropriate lengths so that the central portion where the sealing element is located will be positioned along the speedometer cable assembly 6 at a location where it is easily seen. Hence, there is no difficulty in ascertaining whether the tubular sections 11 and 12 have been loosened. It is not necessary either to inspect beneath the dashboard of the vehicle to view the rear of the speedometer or to crawl beneath the vehicle to observe the connection at the transmission. If the seal is intact this will provide complete assurance that the odometer reading shown is entirely accurate. With the nuts 20 and 21 advanced along the tubular element 18 to compress the sleeves 11 and 12 there can be no access either to the nut 7 or the nut 10. The nuts 20 and 21 of the connection maintain the edges of the receptacle portions 13 and 15 against the speedometer housing and the transmission housing, respectively, so that there can be no entry to the area of the cable connection at either of these locations. The only way the device can be released is to move nuts 20 and 21 toward each other along the threaded tube 18. This requires breaking of the seal of the strip 22, which is detected instantly from the observation of the engine compartment of the vehicle. Thus, unlike prior devices which were quite difficult to inspect, the present device provides a reliable and unmistakable visual signal at a glance.

The device of this invention is assembled easily as the parts individually may be separately slid over the speedometer cable assembly 6. The nuts 20 and 21 may be positioned relatively close to the center piece 19 during initial installation. Then upon rotation of the nuts 20 and 21 so as to increase the distance between them, the end members of the cable sections 11 and 12 are pressed firmly against the transmission and speedometer. This turning of the nuts is facilitated by the hexagonal shape of the center fixed member 19. This allows the tube to be held by a wrench as the nuts are tightened against the members 11 and 12. The nuts are advanced sufficiently to firmly secure the tubes 11 and 12 preventing movement of the receptacle ends 13 and 15.

As a safety precaution, normally it is preferred to include a means to prevent overstretching of the outer sleeve 8 of the speedometer cable assembly 6. Is is possible to elongate this element unduly by excessive movements of the nuts 20 and 21. This enlarges the length of the outer sleeve formed by elements of this invention, which necessarily tends to elongate the speedometer cable assembly which it carries. Damage is effectively prevented, however, by the simple provision of a stainless steel wire 24 that is received within the elements 11, 12, and 18 of this invention and extends the length of the speedometer cable assembly. The ends of wire 24 are attached to the ferrules 25 and 26 at the ends of the outer sleeve 8 of the speedometer cable assembly by suitable means such as silver soldering. This wire, therefore, acts as an inelastic filament that provides a positive means for limiting the amount of elongation of the outer sleeve 8.

The inclusion of the wire 24 adds greatly to the practicality of the invention, allowing it to be installed by relatively unskilled personnel and eliminating guesswork in the tightening of nuts 20 and 21.

While the center portion of the unit where the inner ends of the tubular members 11 and 12 are secured usually includes the screw thread adjustment at sleeve 18, it is possible to omit this feature. In such instances the tube ends merely will be clamped rather than being engaged by nuts on a sleeve. For example, a longitudinally hinged sleeve may fit between the ends of the tubular members 11 and 12 to hold them against the transmission and speedometer housings in the usual manner. As before, a sealing element is included to visually indicate whether the joint has been disturbed. This version of the invention has the advantage of low cost and simplicity, but lacks the versatility of the previously described embodiment.

The foregoing detailed description is to be clearly understood as given by way of illustration and example only, the spirit and scope of this invention being limited solely by the appended claims.

I claim:

1. In combination with a vehicle having a speedometer assembly, a power takeoff having a housing, and drive cable interconnecting said power takeoff and said speedometer assembly, a protective device for said cable comprising
    a first sleeve means receiving portions of said cable adjacent said speedometer assembly,
        one end of said first sleeve means engaging said speedometer assembly,
    a second sleeve means surrounding portions of said cable adjacent said power takeoff,
        one end of said second sleeve means engaging said power takeoff housing,
        the opposite ends of said sleeve means being in a relatively closely spaced relationship with each other,
    and adjustable means forcing said sleeve means away from each other and into said engagement with said speedometer assembly and said power takeoff housing.

2. A device so recited in claim 1 including in addition visual signal means for indicating movement of said adjustable means.

3. In combination with a vehicle having a speedometer assembly, a transmission, and a drive cable interconnecting said transmission and said speedometer assembly, a protective device for said drive cable comprising
    a first tubular member receiving portions of said cable adjacent said speedometer assembly,
        one end of said first tubular member engaging said speedometer assembly,
    a second tubular member receiving portions of said cable adjacent said transmission,
        one end of said second tubular member engaging said transmission,
        said tubular members having inner ends in a relatively closely spaced relationship with each other,
    an exteriorly threaded tube receiving said cable adjacent said inner ends,
        said exteriorly threaded tube having ends slidably received in said inner ends of said first and second tubular members,
    and nut means on said exteriorly threaded tube engaging said inner ends of said first and second tubular members
        for holding said inner ends of said members in said spaced relationship and said one ends thereof in engagement with said speedometer assembly and said transmission.

4. A device as recited in claim 3 in which
    said nut means includes a duality of nuts received on said exteriorly threaded tube,
        one of said nuts engaging one of said inner ends,
        and the other of said nuts engaging the other of said inner ends,
    and including a frangible sealing element interconnecting said nuts,
        whereby, relative rotation of said nuts away from said inner ends will fracture said frangible sealing element.

5. In combination with a vehicle having a speedometer assembly, a transmission, and a drive cable interconnecting said transmission and said speedometer assembly, a protective device for said cable comprising
    a first tubular member receiving portions of said cable adjacent said speedometer assembly, one end of said first tubular member engaging said speedometer assembly,
a second tubular member receiving portions of said cable adjacent said transmission,
one end of said second tubular member engaging said transmission,
said first and second tubular members having relatively closely spaced opposite ends,
a relatively short exteriorly threaded rigid tube around said cable,
the ends of said tube being slidably received in said adjacent ends of said first and second tubular members,
a duality of nuts on said rigid tube,
one of said nuts engaging said opposite end of one of said tubular members,
and the other of said nuts engaging said opposite end of the other of said tubular members
for holding said opposite ends in said spaced relationship,
a fixed outwardly projecting member carried by said threaded tube intermediate said nuts,
said outwardly projecting member and said nuts having apertures therethrough,
and a frangible sealing member extending through said apertures
for precluding substantial movement of said nuts on said threaded member without fracturing said sealing member.

6. A device as recited in claim 5 including in addition a relatively inelastic filamentous member inside of said tubular members,
the ends of said filamentous member being connected to the ends portions of said cable whereby said filamentous member limits the elongation of said cable.

7. In combination with a vehicle having an engine compartment, a speedometer assembly having a housing, a power takeoff having a housing and a drive cable extending through said engine compartment and interconnecting said power takeoff and said speedometer assembly, said drive cable having a first nut attaching one end thereof to said speedometer assembly housing and a second nut attaching the opposite end thereof to said power takeoff housing, a protective device for said drive cable comprising
a first flexible tubular member,
said first member having an enlarged end receiving said first attchment nut,
and a distal edge engaging said speedometer assembly housing
whereby said first attaching nut is retained in said enlarged end,
said second tubular member having an enlarged end receiving said second attaching nut,
and a distal edge engaging said power takeoff housing,
the opposite ends of said tubular members being disposed in said engine compartment and in a relatively closely spaced relationship with each other,
a rigid exteriorly threaded tubular member receiving said cable,
said threaded tubular member having its ends telescopingly received in said opposite ends of said first and second tubular members,
a flange projecting outwardly from said threaded tubular member intermediate the ends thereof,
and flange being fixed relative to said threaded tubular member,
a first nut on said threaded tubular member on one side of said flange,
a second nut on said threaded tubular member on the opposite side of said flange,
said nuts engaging said opposite ends of said first and second tubular members and maintaining said distal edges of said enlarged ends in said engagement with said housings,
and sealing means interconnecting said nuts and said flange for providing a visual signal upon rotation of said nuts relative to said threaded tubular member.

8. A device as recited in claim 7 in which
for said sealing means said nuts and said flange include apertures therethrough,
and including a frangible member extending through all of said apertures,
whereby rotation of said nuts relative to said flange fractures said frangible member.

9. A device as recited in claim 8 including in addition a relatively inelastic wire the tends of which are secured to said cable adjacent said attaching nut, said wire extending through said tubular members and lying alongside said cable for limiting the elongation of said cable.

10. In combination with a vehicle having a speedometer assembly a power takeoff having a housing, and drive cable interconnecting said power takeoff and said speedometer assembly, a protective device for said cable comprising
a first sleeve means receiving portions of said cable adjacent said speedometer assembly,
one end of said first sleeve means engaging said speedometer assembly,
a second sleeve means surrounding portions of said cable adjacent said power takeoff,
one end of said second sleeve means engaging said power takeoff housing,
the opposite ends of said sleeve means being in a relatively closely spaced relationship with each other,
and means holding said opposite ends of said sleeve means in said spaced relationship and said one ends thereof in said engagement with said speedometer assembly and said power takeoff housing.

References Cited in the file of this patent

UNITED STATES PATENTS

| | | |
|---|---|---|
| 1,481,268 | Ohmer et al. | Jan. 22, 1924 |
| 1,947,937 | Henning | Feb. 20, 1934 |
| 1,971,159 | Laurent | Aug. 21, 1934 |
| 2,519,828 | Earnest | Aug. 22, 1950 |